Figure 1:
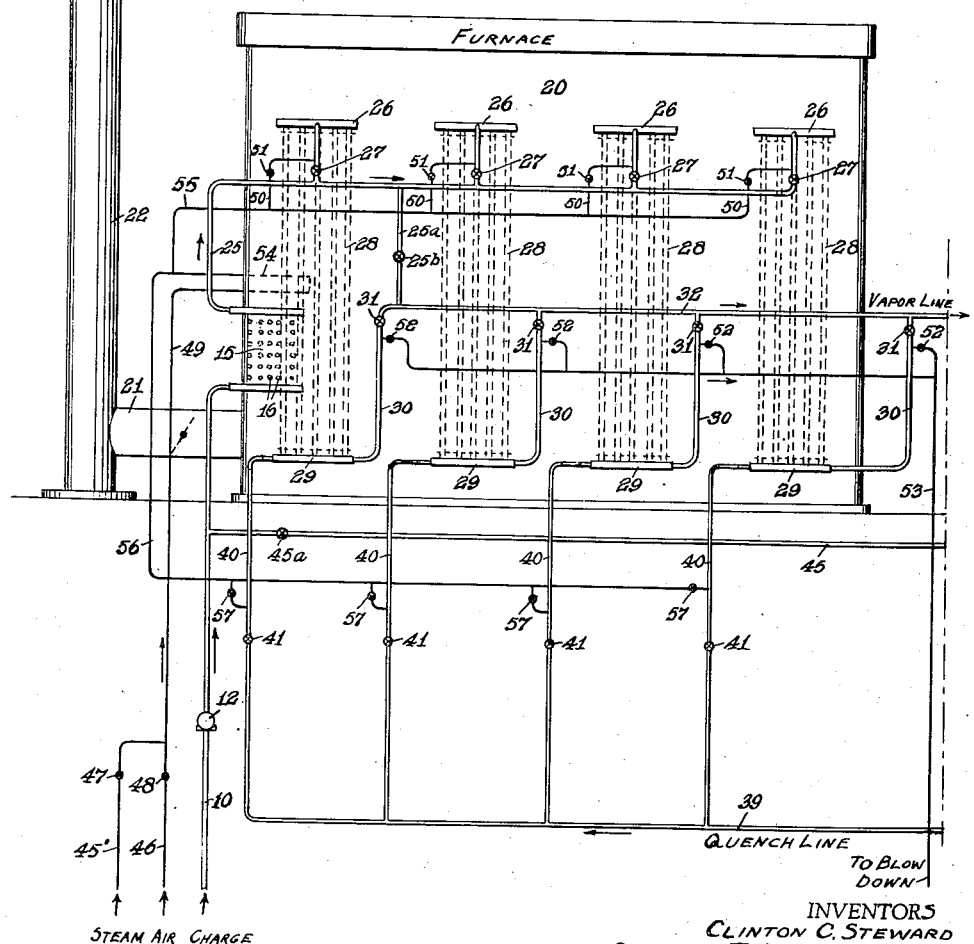

Feb. 1, 1944.   C. C. STEWARD ET AL   2,340,778
PROCESS FOR PRODUCING OLEFINES AND MOTOR FUEL
Filed June 21, 1940   7 Sheets-Sheet 1

INVENTORS
CLINTON C. STEWARD
AND CHARLES T. DRANEY
BY
ATTORNEY

Fig. 2.

Feb. 1, 1944.  C. C. STEWARD ET AL  2,340,778
PROCESS FOR PRODUCING OLEFINES AND MOTOR FUEL
Filed June 21, 1940  7 Sheets-Sheet 3

INVENTORS
CLINTON C. STEWARD
BY AND CHARLES T. DRANEY
ATTORNEY.

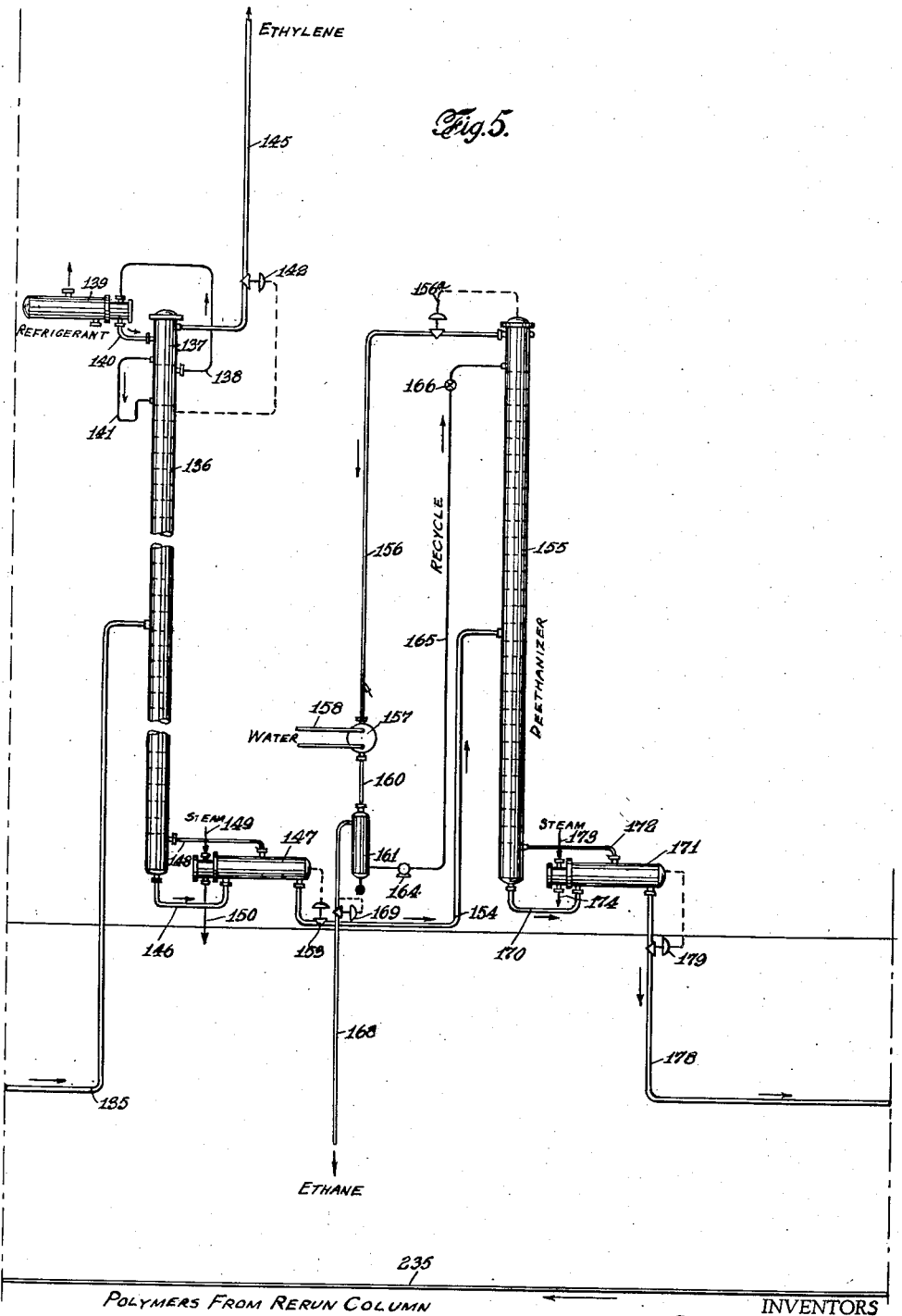

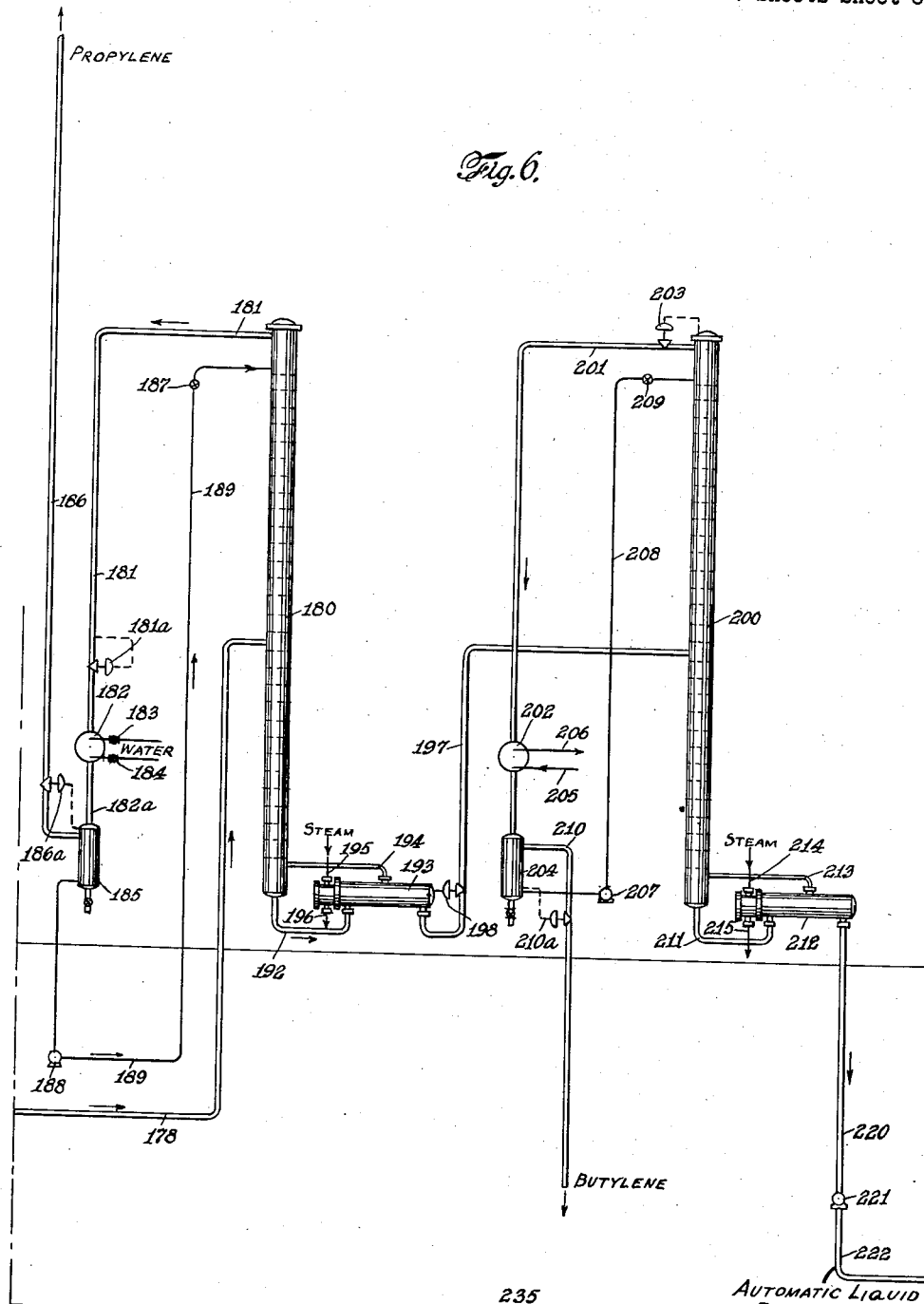

Feb. 1, 1944. C. C. STEWARD ET AL 2,340,778
PROCESS FOR PRODUCING OLEFINES AND MOTOR FUEL
Filed June 21, 1940

INVENTORS
CLINTON C. STEWARD
AND CHARLES T. DRANEY
BY
ATTORNEY.

Patented Feb. 1, 1944

2,340,778

UNITED STATES PATENT OFFICE 2,340,778

PROCESS FOR PRODUCING OLEFINS AND MOTOR FUEL

Clinton C. Steward, Whittier, Calif., and Charles T. Draney, Portland, Oreg.

Application June 21, 1940, Serial No. 341,684

2 Claims. (Cl. 196—96)

This invention relates to a process for separating gases and more particularly to a process for separating from gas mixtures constituents having closely related boiling points such, for example, as methane, ethylene, ethane, propylene and butylene and liquids in the motor fuel boiling range having a high octane number and a high octane blending value. These constituents may be present in gas mixtures resulting, for example, from the conversion of hydrocarbons, as set forth in a co-pending application of R. E. Lidov, Ser. No. 327,469, filed April 2, 1940.

An object of the present invention is to provide a process of the type above indicated having novel and improved combinations of steps and conditions of operation.

Another object is to provide a novel and improved process for separating ethylene, propylene, butylene and a liquid motor fuel fraction.

Another object is to provide a complete unitary process of the above type which is adapted to continuous operation and which requires a minimum amount of attention and control.

Various other objects and advantages will be apparent as the nature of the invention is more fully disclosed.

The present invention is applicable to gas mixtures containing various gases such as hydrogen, methane, ethylene, ethane, propylene and butylene and a liquid boiling in the motor fuel range consisting substantially of benzol, toluol and xylol, obtained for example as a product of the conversion process set forth in the Lidov application above mentioned. In accordance with the present invention this mixture is treated for the removal of the higher boiling residues and the subsequent separation of the gaseous olefins, the fuel gases and the motor fuel fraction. The olefins may be further separated into their components such, for example, as ethylene, propylene and butylene if desired. The liquid boiling in the motor fuel range may consist essentially of benzol, toluol and xylol and in its entirety will possess a high octane number and high octane blending number which renders it suitable with but little subsequent treatment for use directly as a motor fuel or as a blending agent for increasing the octane number of other motor fuel. It may also be used as a source for the production of the aromatic benzol, toluol and xylol in pure form. The liquid fraction, depending on the operating conditions, may have a smaller proportion of the aforesaid aromatics but will, in any event, be characterized by high octane and high octane blending values which render it, after but little subsequent treatment, suitable for use as a motor fuel or as a blending agent for increasing the octane number of other motor fuel.

Although the novel features which are believed to be characteristic of this invention are more particularly pointed out in the claims appended hereto, the invention itself may be better understood by referring to the following description, taken in connection with the accompanying drawings, in which a specific embodiment thereof has been set forth for purposes of illustration.

Figure 3:
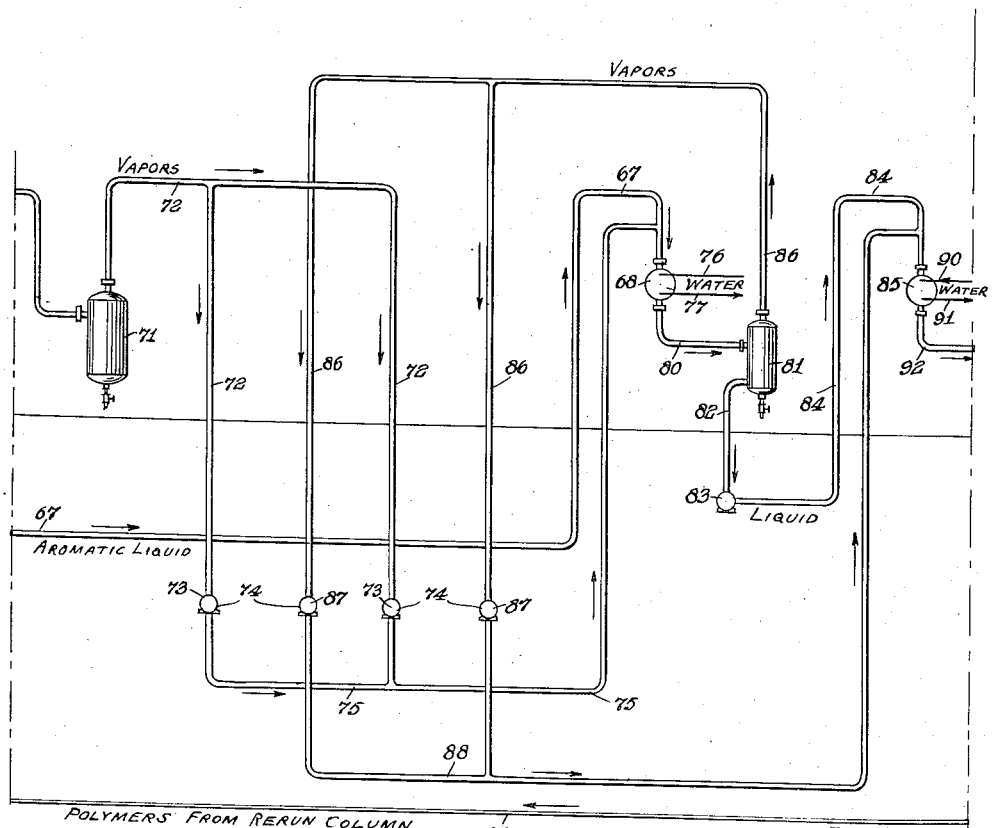
Figure 7:
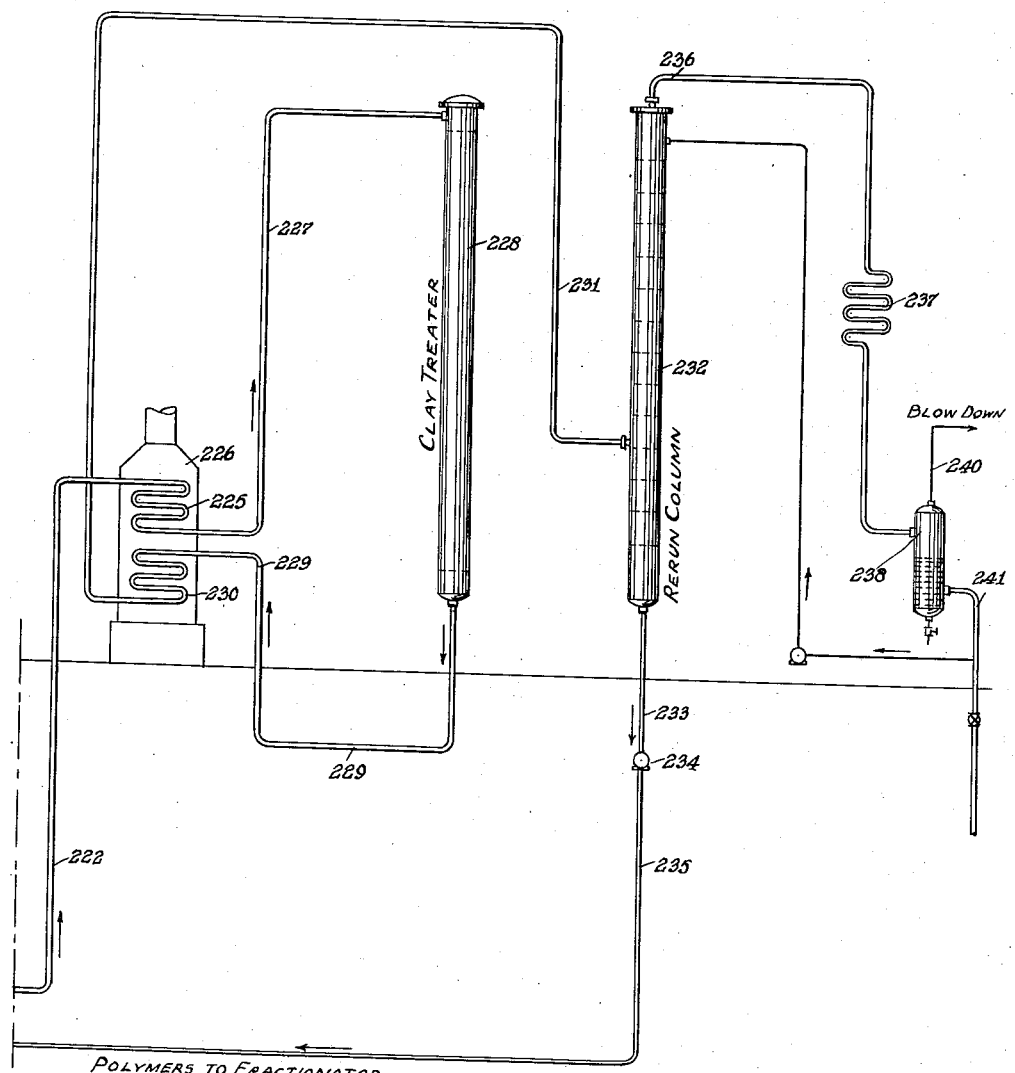

In the drawings, Figs. 1 to 7, when combined in the order of figure numbers, represent diagrammatically a plant in which the process of the present invention may be carried out.

Referring to the drawings more in detail, the charging stock is supplied through a line 10 and pump 12 to a vaporizer coil 15. In the embodiment shown, this vaporizer coil comprises a bank of tubes 16 in a converter furnace 20. The furnace 20 may have a combustion chamber and a convection zone arranged in any convenient manner. Inasmuch as the furnace may be of standard construction, the various details thereof have not been set forth herein. It is to be understood that the tubes 16 may be located in the convection zone to be heated by the combustion gases prior to their removal from the furnace through a duct 21 to a stack 22.

The charging stock may be heated in the vaporizer coil 15 to a temperature such that complete vaporization takes place. It is to be understood, however, that if the nature of the charge is such that complete vaporization without cracking cannot be obtained in the vaporizer coil, the unvaporized portion of the charge may be removed by a suitable separating apparatus not shown. Suitable preheating means may be provided for preheating the charge prior to its application to the vaporizer coil if desired. This may take the form of a heater, or heat exchanger supplied with hot fluid from a subsequent stage of the process.

The vapors from the vaporizer coil 15 are passed through a line 25 to a plurality of supply headers 26, the flow of vapors to each header being controlled by an individual valve 27. To each header 26 is connected a bank of conversion tubes 28 which are located in the furnace 20 in a position to be heated therein to a high temperature. They may, for example, be located in the radiant heat zone of the furnace. The conversion tubes may contain a suitable catalyst.

Figure 2:
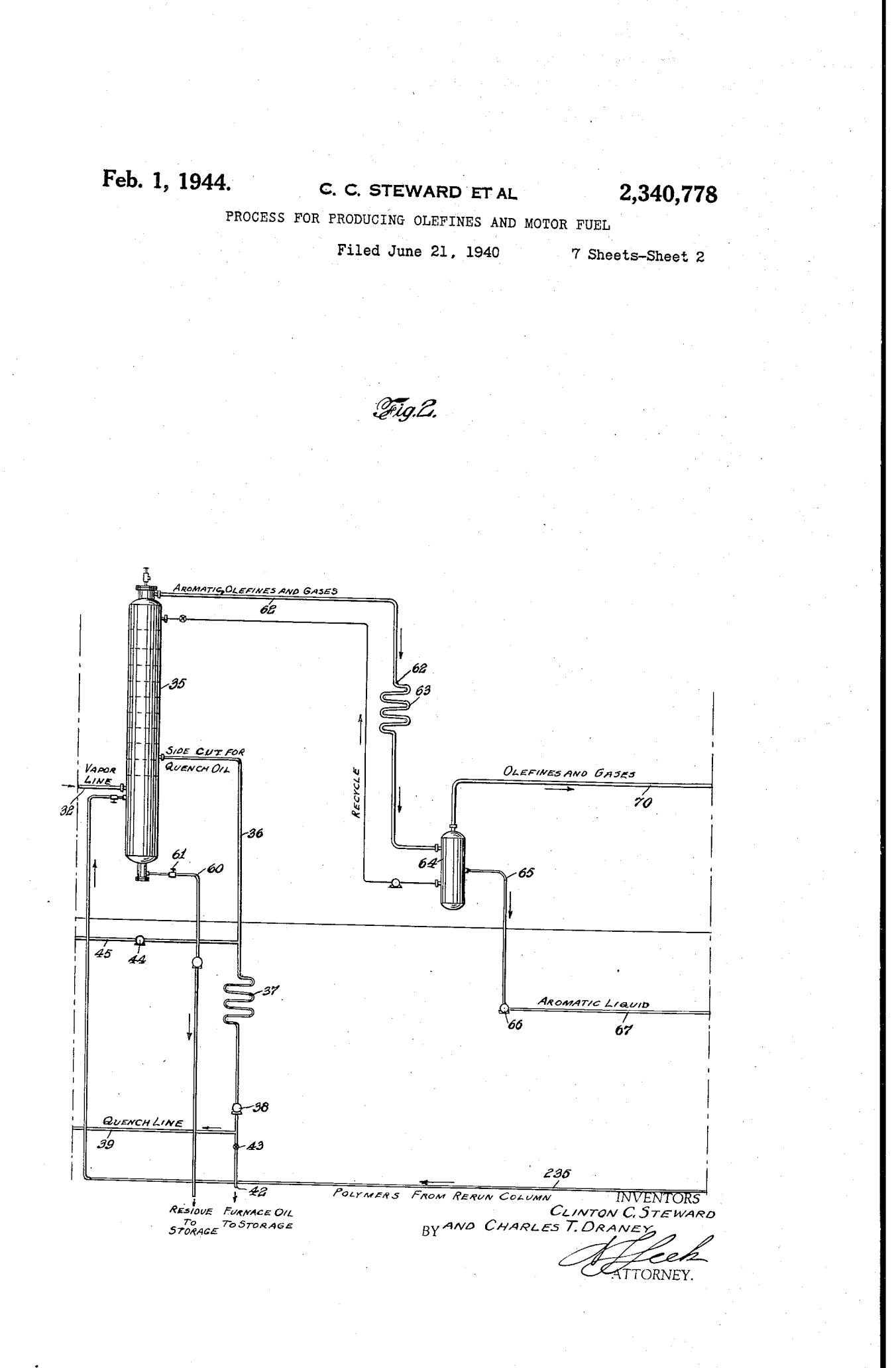

The tubes 28 of each bank are shown as connected to an outlet header 29 and thence through individual lines 30 controlled by valves 31 to a line 32 by which they are supplied to suitable separating apparatus shown as a fractionating column 35 (Fig. 2). The tubes 28 may be arranged vertically or horizontally and it is to be understood that the number of banks of tubes may be increased or decreased as desired. Four banks of vertical tubes have been shown merely for purposes of illustration. It is also to be understood that the furnace may be fired by suitable burners, not shown. A bypass 25a having a valve 25b is connected between the lines 25 and 32 to permit the converter tubes 28 to be bypassed during warming up periods before complete vaporization takes place in the vaporizer coil 15.

The cracked vapors emerging from the tubes 28 are immediately cooled to below conversion temperature by the introduction of a suitable quench oil into the vapor stream. In the embodiment shown, the quench oil is taken as a side cut from an intermediate portion of the fractionating column 35 by means of a line 36, is cooled in a cooler 37 and is thence pumped by means of a pump 38 through a quench line 39 and branch lines 40 controlled by valves 41 to the various outlet headers 29. The quench oil may be injected into the headers under conditions to commingle with the vapor stream therein and to cool the same substantially instantaneously to a temperature below that at which further reaction takes place. The oil is preferably injected into the header in the form of a fine spray which is immediately vaporized by the heat of the vapors and thereby extracts sufficient heat therefrom to reduce the temperature of the mixture to the point required.

Any excess of the side cut over that required for quenching purposes may be passed through a line 42 controlled by a valve 43 to storage or for use as fuel oil, or may be recycled as charging stock for the process by means of a pump 44 and a line 45 controlled by a valve 45a. This side cut may, for example, correspond in boiling range to a gas oil. While the side cut has been shown for convenience, as taken directly from the fractionating column 35, it is to be understood that a suitable side-cut stripper such as a steam stripper of standard form may be used if desired.

Air and steam for reactivating the catalyst in the tubes 28 may be supplied from a steam line 45' and an air line 46, controlled by valves 47 and 48 respectively through a line 49 to a coil 54 which may constitute a preheater or superheater coil in the furnace 20, thence through a line 55 and branch lines 50 controlled by valves 51 to the supply headers 26. The outlet headers 29 may be connected through valves 52 to a blow down line 53. Steam may also be introduced by line 56 through individual valves 57 into the lines 40 so as to prevent overheating of the outlet headers during the reactivation periods.

When a bank of converter tubes is to be cleaned or reactivated, the corresponding valves 27, 31 and 41 are closed to remove the bank from the vapor stream and to interrupt the supply of quench oil thereto. By opening the valves 51 and 52 associated with the bank to be reactivated and by suitable control of the valves 47 and 48, air and steam may be supplied to the tubes from the lines 45' and 46 in regulated quantities as required for reactivation purposes and the reactivation products may be removed through the blow down line 53.

After reactivation, the bank may again be placed on stream by a reverse operation of the above-mentioned valves. The furnace may be operated in this way with three of the banks always on stream while the fourth bank is removed for reactivation. In this way the operating capacity of the furnace is maintained at a maximum. It is of course obvious that the number of banks may be increased if desired, in which event, a still higher percentage of effective capacity is obtained.

The vapors leaving the converter furnace through the line 32 contain the olefinic gases and the motor fuel fraction, and in addition, heavier and lighter products which must be separated and removed. The fractionating column 35 is operated at temperatures and pressures to separate the high boiling constituents, such as heavy fuel oil, furnace oil and other residue at the bottom of the column. This residue is removed from the column through a line 60 controlled by a valve 61. A side cut corresponding to a gas oil is removed through the line 36 as above mentioned.

The overhead vapors from the column 35 contain the motor fuel fraction, olefins and other permanent gases, such as ethane, methane and hydrogen. These are taken through a line 62 and a reflux condenser 63 to a receiver 64 at suitable temperatures and pressures to effect a primary separation of the motor fuel fraction from the olefins and other permanent gases. The liquid is removed from the receiver 64 through a line 65 and is fed by a pump 66 through a line 67 to an interstage cooler 68 to be described.

The vapors from the separator 64 are taken by a line 70 through a scrubber 71 in which any liquid entrained therein is removed and may be introduced by a suitable pump not shown, into the line 67. From the scrubber 71 the vapors pass through a line 72 to the first stages 73 of a pair of compressors 74 in which the gases are compressed to an intermediate pressure. The compressed gases are then let through a line 75 to the interstage cooler 68 wherein they are commingled with the aromatic liquid from the line 67 in order to saturate the liquid at the temperature and pressure of the cooler 68. The cooler 68 may comprise a water cooler having a water feed line 76 and a water discharge line 77. It is to be understood that this cooler may be of any desired type and is adapted to remove the heat of compression and to condense the normally liquid constituents of the combined fluid.

From the cooler 68 the fluid is taken through a line 80 to a receiver 81 from which the condensate is removed through a line 82 and is fed by a pump 83 through a line 84 to a second cooler 85. The vapors from the receiver 81 are taken through a line 86 to the second stages 87 of the two-stage compressors 74 in which they are raised to the desired high pressure. The high pressure fluid is then supplied through a line 88 to the cooler 85, above mentioned, wherein it is commingled with the liquid received from the line 84 in order to augment condensation at the temperature and pressure of the cooler 85.

The interstage cooler 85 may be similar to the interstage cooler 68, above mentioned, and may comprise a water cooler having a water feed line 90 and a water discharge line 91. The cooler 85 is operated to remove the heat of compression, whereby further quantities of liquid are condensed out of the fluid stream. The fluid stream is then taken through a line 92 to a receiver 93 wherein the condensate is removed through a line 94 and is re-introduced into the fluid stream at a later stage of the process to be described.

The highly compressed vapors from the receiver 93 are passed through a line 95 to a first dehydrator 96 and thence through a line 108 to a second dehydrator 97. The dehydrators may contain dehydration material of any suitable type, such, for example, as silica gel, di-ethylene glycol or "activated alumina" dehydrators. The dehydrating material may be reactivated by live steam supplied from a line 100 to coils 98 and 99 located respectively in the dehydrators 96 and 97 and controlled by individual valves 101 and 101a. After passage through the coils 98 and 99, the steam is removed through an exhaust line 102 which may lead to a steam condenser, a hot well or the like. The steam outlet from the coils 98 and 99 may be controlled by individual valves 103 and 103a.

For operating the dehydrators at a reduced pressure during reactivation, the steam may be supplied through a line 104 to a jet 105, the low pressure point of which is connected by a line 106 and valves 107 to the dehydrators above mentioned. Exhaust steam from the jet 105 may be passed to a blow down system to a condenser.

Two dehydrators have been shown as connected in series in order to effectively remove any traces of moisture from the highly compressed vapors. Such removal is necessary because of the low temperature to which the vapors are to be cooled in the de-methanizer zone. It is to be understood that additional dehydrators may be provided for use when the de-hydrators 96 and 97 are removed from stream for reactivation purposes. Such additional de-hydrators have been omitted from the drawings for clearness of description.

The highly compressed and dehydrated vapors from the dehydrator 97 are now passed through a line 109 to a heat exchanger 110 wherein they are pre-cooled for introduction through a line 111 to a fractionating column 112, herein referred to as a de-methanizer column, which is operated at a temperature and pressure suited to the fractional separation of the methane and lower boiling constituents, such as hydrogen, as an overhead vapor.

Vapors from the top of the column 112 are passed through a line 116 to a low temperature reflux condenser 117 from which they are passed through a line 118 to a receiver 115. The condensate from the receiver 115 is returned through a line 120 to the top of the column 112. The separated vapor, which consists of methane and lower boiling constituents, such as hydrogen, is removed from the receiver 115 through a line 125 by which it is supplied to the heat exchanger 110 and used for pre-cooling the incoming vapors as above mentioned. After passage through the heat exchanger 110, the vapors are removed from the system through a line 126 and may be used for fuel gas or supplied to storage. The pressure in the column 112 may be controlled by an automatic valve 129 in the line 125.

The liquid from the base of the de-methanizer column 112 is supplied through a line 127 to a reboiler 128, having a water feed line 130 and a water discharge line 131. The vapors from the reboiler 128 are returned to the column 112 through a line 129.

The liquid from the reboiler 128, together with liquid from the line 94, above described, is passed through a line 135 to a second fractionating column 136, referred to herein as an ethylene rectifier, which is operated at temperatures and pressures suited to remove the ethylene as an overhead vapor. The line 135 may be provided with a valve 135a adapted to maintain a constant liquid level in the column 112 and associated apparatus and to pass the liquid at a lower pressure to the column 136. The valve 135a may be automatically operated to maintain the desired liquid level in the reboiler 128. Vapors from the top of the column 136 are passed through a line 138 to a low temperature reflux condenser 139 and thence through a line 140 to a receiver 137. The liquid condensate from the receiver 137 is returned by a line 141 to the top of the column 136. The vapors, principally ethylene, are removed from the receiver 137 by a line 145 having an automatic pressure control valve 142. The low temperature condensers 117 and 139 are refrigerated in a manner to be later described.

The liquid fraction is passed from the base of the ethylene rectifier column 136 through a line 146 to a reboiler 147 from which the vapor is returned through a line 148 to the column 136. The reboiler 147 may be heated by steam supplied from a feed line 149 and discharged through a line 150.

The liquid fraction from the reboiler 147 is passed through a line 154 to a third fractionating column 155, herein referred to as a de-ethanizer column, which may be operated under suitable conditions to separate the ethane as an overhead vapor. A valve 153 may be provided in the line 154 to maintain desired conditions in the column 136 and to pass the liquid at a reduced pressure to the column 155. The valve 153 may be automatically operated in accordance with the liquid level in the reboiler 147.

Vapors from the top of the column 155 are passed through a line 156 and a back pressure valve 156a to a reflux condenser 157 from which they are passed through a line 160 to a receiver 161. The condenser 157 may be supplied with a suitable heat exchange fluid, such as water, through a feed line 158. The condensate from the receiver 161 may be returned by a pump 164 through a line 165 and check valve 166 to the top of the column 155. The vapor from the receiver 161, principally ethane, is removed through a line 168 having a pressure control valve 169 and may be used as such or may be combined with the methane from the line 126 for use as fuel gas.

The receivers 115 and 137 have been shown as built in the tops of the de-methanizer column 80, 112 and the ethylene rectifier 155 respectively, and the corresponding reflux condensers 117 and 139 as located above the column tops in order to avoid the necessity for pumping the cold, high pressure reflux. They may be otherwise located, however, if desired.

The liquid fraction from the de-ethanizer column 155 is passed through a line 170 to a reboiler 171 having a steam supply line 173 and a steam discharge line 174. The vapors from the reboiler 171 are returned to the column 155 through a line 172. The liquid fraction is passed through a line 178 to a fractionating column 180, referred to herein as a propylene rectifier, which is operated under conditions to separate the propylene as an overhead vapor. The line 178 may be provided with an automatic pressure reducing valve 179 controlled in accordance with the liquid level in the reboiler 171.

The overhead vapors from the column 180 are passed through a line 181 and an automatic pressure control valve 181a adapted to maintain the desired pressure in the column 180 to a reflux condenser 182 which may comprise a water cooler having a water feed line 183 and a water discharge line 184. From the condenser 182 the fluid passes through a line 182a to a receiver 185 which is adapted to remove the condensate from the vapors, principally propylene, which are then removed from the system through a line 186 having a pressure control valve 186a. The liquid reflux from the receiver 185 is pumped by a pump 188 through a line 189 and a check valve 187 to the top of the column 180 for temperature control purposes.

The liquid fraction from the bottom of the propylene rectifier column 180 is passed through a line 192 to a reboiler 193 having a steam feed line 195 and a steam discharge line 196. The vapors from the reboiler 193 are returned from the column 180 through a line 194.

The liquid fraction from the reboiler 193 is passed through a line 197 and an automatic pressure reducing valve 198 to a fractionating column 200, referred to herein as a butylene rectifier, operated under conditions to separate the butylene as an overhead fraction. The overhead vapors from the column 200 are removed through a line 201 and automatic pressure control valve 203 to a reflux condenser 202 which may comprise a water cooler having a water feed line 205 and a water discharge line 206. The reflux is passed to a receiver 204, the condensate from which is pumped by a pump 207 through a line 208 and a check valve 209 to the top of the column 200 for temperature control purposes. The vapors from the separator 204, consisting principally of butylene, are removed through a line 210 and an automatic pressure control valve 210a.

The liquid fraction from the bottom of the butylene rectifier column 200, consisting of substituents heavier than butylene, such, for example, as aromatic liquid hydrocarbons in the motor fuel boiling range, is passed through a line 211 to a reboiler 212, the vapors from which are returned to the column 200 through a line 213. The reboiler may have a steam feed line 214 and a steam discharge line 215.

The liquid from the reboiler 212 is passed by a pipe 220 to a pump 221 by which it is fed through a line 222 to a heating coil 225 which, in the embodiment shown, is included in a heater 226 of any convenient type. In the heating coil 225 the liquid is reheated to a treating temperature and is supplied in liquid phase by a line 227 to the top of a treating column 228 which may comprise, for example, a treating column containing clay, infusorial earth or other commonly known treating substance adapted to promote the polymerization of the unstable compounds.

The liquid, after passage through the treater 228, is fed through a line 229 to a heating coil 230 which may be included in the heater 226, and thence through a line 231 to a rerun column 232 which is adapted to separate the polymers and other heavy constituents from the desired motor fuel fraction. The polymers are removed from the bottom of the rerun column 232 through a line 233 and are fed by a pump 234 through a line 235 to the fractionating column 35, Fig. 2, in which they are subjected to conditions for the separation and recovery of the various constituents thereof.

The overhead vapors from the treating column 232, which contain the aromatic motor fuel fraction above mentioned, are passed through a line 236 and condenser 237 to a receiver 238 which is operated at a temperature and pressure to condense the motor fuel fraction and to separate any remaining lower boiling constituents. The latter may be removed through a blow down line 240.

The motor fuel fraction is removed from the receiver 238 through a line 241 and may be supplied to suitable treating apparatus or to storage for use as a high anti-knock motor fuel or as a blending agent.

It is to be understood that if the product contains sulphur compounds these may be removed by suitable sweetening apparatus and that an inhibitor may be added to the motor fuel to prevent the formation of undesired products therein.

In carrying out the present process for the conversion of a charging stock within the gasoline boiling range (100° F. to 380° F.) or a charging stock such as gas oil (380° F. to 750° F.) which contains no non-volatile reject, the charge may be heated in the vaporizer coil 15 to a temperature of 650° F. to 850° F. at a suitable pressure to cause the desired rate of gas flow through the remaining apparatus, such, for example, as a pressure varying from a partial vacuum to about 150 lbs., the particular temperature and pressure conditions being selected so that no substantial cracking will take place prior to the conversion step. In the event that the crude contains a fraction which cannot be vaporized without cracking at the above temperatures, the latter is removed by passing the vapors through a suitable flash chamber or other suitable separating means, not shown.

The vapors from the vaporizer coil or from the flash chamber are passed directly into the conversion unit where they are contacted with the catalyst in the tubes 28 under conditions of temperature, pressure and space velocity adapted to favor the formation of the desired product.

In a specific embodiment of the invention, utilizing Michigan gas oil of about 39 gravity and operating to favor the production of ethylene, the charging stock may be supplied to the vaporizer coil 15 at a temperature of about 80° F. and a pressure of 100 lbs. per sq. inch. In the vaporizer coil the temperature may be raised to about 800° F. and the vapors supplied to the inlet headers 26 at about 60 lbs. pressure. The vapors may leave the converter tubes 28 at an outlet temperature of about 1400° F. and at a pressure of about 30 lbs. and are immediately quenched in the outlet header 29 to a temperature of about 650° F. They are then supplied through the line 32 at this temperature and at a pressure of about 27 lbs. to the fractionating column 35. The fractionating column 35 may be operated at an overhead temperature of 310° F. and a bottom temperature of 600° F. and at a pressure of about 24 lbs., the pressure having been reduced to this value because of the pressure drop in the line 32. The overhead vapors from the fractionating column 35 may then be cooled in the reflux condenser 63 to a temperature of about 90° F., the condensate being removed in the receiver 64.

The dry vapors are then compressed by the first stages 73 of the compressors 74 to a pressure of about 140 lbs., the heat of compression raising the pressure thereof to about 200° F. The vapors, combined with the liquid from the receiver 64, are then cooled in the water cooler 68 to a temperature of about 90° F., after which they are further compressed in the second stages 87 of the compressors 74 to a pressure of about 600 lbs. This again raises the temperature of the vapors to about 200° F. The vapors and the liquids from the receiver 81 are then combined and cooled in the cooler 85 to a temperature of about 90° F. and the condensate is removed in the receiver 93.

The vapors, now at a pressure of about 600 lbs. and at a temperature of 90° F., are thoroughly dehydrated in the dehydrators 96 and 97, after which they are cooled in the heat exchanger 110 to a temperature of about 37° F., at which temperature and pressure they are introduced into the de-methanizer column 112. The reflux condenser 117 is operated with an outlet temperature of −90° F. receiving vapors from the column 112 at about −30° F. At this temperature and pressure, a satisfactory separation of the methane and lighter constituents from the ethylene and heavier constituents is obtained. In the above embodiment the de-methanizer column is operated at a high pressure so as to reduce the required refrigeration to the lowest possible value suited to an efficient separation. The pressure should be as close to the pseudo-critical pressure of the methane mixture as commercial operations permit, but should not be so high as to cause formation of a retrograde phase. A pressure of 600 lbs. has been selected with this consideration in view.

The reboiler 128 may be operated at a temperature of about 75° F. and at a pressure of about 600 lbs. by a suitable supply of cold water through the feed line 130. This temperature at the above mentioned high pressure, is adapted to effect a further removal of any remaining methane and lighter constituents from the liquid at the base of the de-methanizer column 112.

The ethylene rectifier 136 is operated at as high a pressure as possible while still obtaining the desired flow from the reboiler 128. This may, for example, comprise a pressure of about 550 lbs., the valve 135a being set for a pressure drop of about 50 lbs. The reflux condenser 139 at the top of the ethylene rectifier may be operated at an outlet temperature of about 30° F., receiving the vapors from the column 96 at a temperature of about 35° F.

The reboiler 147 at a pressure of 550 lbs. may be operated at a temperature of about 192° F. to remove any remaining ethylene and lighter constituents.

The de-ethanizer column 155 is operated at as high a pressure as possible consistent with a free flow from the reboiler 147 such, for example, as a pressure of about 525 lbs. The liquid is accordingly introduced into this de-ethanizer column 155 through the line 154 at a temperature of 190° F. and at a pressure of 525 lbs. The reflux condenser 157 may be operated at an outlet temperature of 90° F., receiving vapors from the column at about 95° F.

The reboiler 171 may be operated at a pressure of 525 lbs. and at a temperature of 230° F. which is adapted to effect a removal of further quantities of ethane and lighter products.

The propylene rectifier column is preferably operated under conditions such that a convenient temperature may be obtained at the outlet of the reflux condenser 182. In the present embodiment this outlet temperature may be of the order of 90° F. Under these conditions, a pressure of about 250 lbs. is suited to the separation of the propylene as an overhead vapor. The liquid from the reboiler 171 is accordingly supplied to the propylene rectifier column 180 at a temperature of about 200° F. and at a pressure of about 250 lbs. The overhead vapors in the line 181 which may have a temperature of about 110° F. are passed through a valve 181a adapted to maintain the desired pressure on the propylene rectifier column and to reduce the gas pressure in the condenser to about 225 lbs. The vapors are then cooled in the condenser 182 to a temperature of about 90° F. and are separated in the receiver 185. The reflux from this receiver is pumped through the line 189 and check valve 187 to the top of the column for temperature control purposes, the propylene vapor being removed through the line 186.

The reboiler 193 may be operated at a temperature of about 235° F., which is suited to the removal of further quantities of propylene or lighter constituents.

In order to operate the butylene rectifier column 200 at about the same temperature range as the propylene rectifier, the liquid leaving the reboiler 193 is reduced in pressure by the valve 198 to about 145 lbs. and is supplied at this pressure and at a temperature of about 210° F. into the butylene rectifier column through the line 197. The overhead from this column at a temperature of about 120° F. is passed through a back pressure valve 203 which may reduce the pressure to about 125 lbs. to the condenser 202 wherein it is cooled to about 90° F. and is separated in the receiver 204, the condensate being pumped back to the top of the column for temperature control purposes.

The reboiler 212 may be operated at a temperature of about 275° F. for the removal of any further content of butylene and lighter constituents which are returned to the column 200 through the line 213.

The liquid from the reboiler 212 may then be pumped by the pump 221 at a pressure of about 600 lbs. through the line 222 to the heating coil 225 wherein it may be reheated to a temperature of about 500° F. at which temperature and pressure it is supplied to the treating column 228. The above mentioned high pressure is required in order to force the liquid through the treating material in this column.

The liquid leaving the treating column 228 may have a somewhat lower temperature and a pressure of about 25 lbs. It is then reheated in the coil 230 and may be supplied to the re-run column 232 at a pressure of about 7 lbs. The stabilizer 232 may be operated at a top temperature of about 300° F. At this temperature and pressure the desired aromatic fraction is in the vapor phase and may be removed as an overhead. The vapor may be condensed in the reflux condenser 237 at a temperature of about 90° and at about atmospheric pressure, and the permanent gases are removed therefrom in the receiver 238. The final product, now at about atmospheric pressure and temperature is withdrawn through the line 241 for use as desired.

It will be noted that in the above described system the product, after conversion in the converter furnace 20 and the removal of the heavier constituents in the fractionating column 35, is recompressed to a suitable high pressure specified, for example, as 600 lbs. and is passed through the various fractionating columns at a progressively decreasing pressure whereby the necessity for using recompressing apparatus is avoided until after the aromatic liquid has been separated from the various other constituents, when the liquid is again raised to a high pressure for passage through the treating column. The temperatures, on the other hand, are progressively increased from a temperature of −90° F. at the top of the demethanizer column to a temperature of about 275° F. at the bottom of the butylene rectifier. This progressive reduction in pressure and progressive increase in temperature avoids, insofar as possible, heat losses and power losses. At the same time it permits an accurate control of the separating conditions to be maintained so that the various constituents may be progressively separated as the hydrocarbon fluid proceeds through the system. With the use of certain types of charging stock, the quantity of ethane produced may be negligible or, for other reasons, it may be unnecessary to separate the same, in which event, the de-ethanizer column 155 may be omitted. It is to be understood, of course, that in certain instances it may not be necessary to separate the butylene and propylene from the ethylene, in which event the various olefins may be separated and used in combined form with suitable changes in the operating conditions of the respective fractionating columns.

In the above described system, the operating conditions are such that the various constituents are removed in a commercial degree of purity and are suitable for commercial use. It is to be understood that if the ethane content of the gas mixture is low or if the presence of ethane in the propylene fraction as well as in the liquid fraction removed from the base of the propylene rectifier is not harmful, the de-ethanizer column may be omitted and the propylene rectifier may be operated under conditions to split the ethane between the overhead vapor fraction and the bottom liquid fraction. If the quantity of ethane is sufficiently large, however, it is commercially profitable to remove the same separately by the use of a de-ethanizer column, as above mentioned, and to use the ethane as fuel gas or for supplying other heat requirements of the plant.

It is to be noted that the reflux condensers have been located at the top of the de-methanizer column, and the ethylene rectifier. This avoids pumping of the low temperature, high pressure condensate and provides an efficient arrangement. The reflux condensers in the case of the de-ethanizer column and the propylene and butylene rectifiers are mounted over the receivers so as to avoid additional construction costs which would otherwise be required and the condensate is pumped to the top of the columns.

The gases are shown as compressed in two stages because of the high pressure which is required for the de-methanizer column. This also permits the heat of compression to be removed after each stage, thereby simplifying the control problem. It is to be understood that two stages are shown for purposes of illustration and that the arrangement may be modified as desired. It is also to be understood that two sets of compressors have been shown merely for purposes of illustration. The number of sets of compressors will of course depend on the capacity of the compressors and on the quantity of material which is to be passed therethrough.

The reflux condenser outlet temperatures and the top column temperatures are preferably selected at about the dew point of the vapors at the respective pressures at those points. The reboiler temperatures may be such that the sum of the partial pressures of the various constituents about equals the total pressure on the system at the corresponding points. In this way a selective separation in about the ratios of the partial pressures takes place. It is to be understood that the above figures are given as examples only and that variations in operating conditions may be made as will be apparent to a person skilled in the art.

Obviously, suitable back pressure valves may be incorporated in the various overhead vapor lines and at suitable other points to maintain the desired pressure conditions. In the case of the de-ethanizer column, the propylene rectifier and the butylene rectifier, a back pressure valve is positioned in the vapor line between the column and the reflux condenser in order to prevent changes in condenser conditions from affecting the operation of the system and to facilitate the proper system control. Such valves of course cannot be used with the de-methanizer column and the ethylene rectifier where gravity flow is used to return the reflux to the columns. If desired, however, such valves may be used and suitable pumping means provided for the reflux.

The reflux ratios are dependent upon various operating factors such as size and number of trays, vapor velocity etc. In the present embodiment, the various columns are designed as nearly identical as possible for constructional reasons and the operation is controlled by varying the reflux ratio. However, in the case of the ethylene rectifier the number of trays should be increased so as to keep to a minimum the ethane content of the overhead vapors without requiring excessive refrigeration equipment.

This system possesses the important commercial advantage of being adaptable to produce substantially pure ethylene, butylene and propylene, as well as an aromatic fraction having a high octane number and a high blending value. All of these products have a wide commercial demand. Furthermore, the system may be operated under conditions to favor the production of any one of these products, depending upon the existing demand. In any event, a comparatively low grade charging stock, such as a gas oil, is converted into a plurality of more valuable products.

Using a virgin gas oil of 36–38° A. P. I. gravity boiling between 380° F. and 750° F. with a converter tube outlet temperature of between 1375° F. and 1450° F., the oil processed, depending on the rate of flow, pressure and catalyst, may yield on a once-through basis about the following products:

| | Per cent by weight |
|---|---|
| Gas | 50–75 |
| Motor fuel | 20–10 |
| Recycle stock | 24–12 |
| Non-volatile reject | 6–3 |

The gas may contain, by volume, not less than:

| | Per cent |
|---|---|
| Ethylene | 26 |
| Propylene | 12 |
| Butylene | 8 | and it may contain not more than 45%, by volume, of methane, ethane and hydrogen. The motor fuel fraction will be a liquid rich in aromatics with a gravity in the range of 30–38° A. P. I. and an octane number of from 90–112.

If the converter tube outlet temperature is in the range of 1200° F. to 1375° F., the oil processed may have the following composition:

| | Per cent by weight |
|---|---|
| Gas | 20–40 |
| Motor fuel | 32–20 |
| Recycle stock | 38–32 |
| Non-volatile reject | 10–8 |

The gas will contain not less than:

| | Per cent |
|---|---|
| Ethylene | 24 |
| Propylene | 14 |
| Butylene | 6 | and may contain not more than 49% of methane, ethane and hydrogen. The liquid boiling in the gasoline range will, in this case, be substantially less aromatic than that produced under the higher temperature conditions of the first example but will be characterized by its high octane values and will be suitable for use either directly as a motor fuel or as a blending agent for improving the octane number of motor fuels. It will have an octane number in excess of 75, and a blending value in excess of 90.

The above are given as examples only and it is to be understood that other variations in operating conditions will produce products having other compositions.

While the novel cooperative relationship between the various steps of the process combine to effect an improved, efficient and commercially practical conversion unit, many of the novel features are adaptable to use in other combinations and in other types of cracking processes and for the treatment of other materials. Various other features and advantages of the invention, both in the individual steps and in the various combinations thereof will be readily apparent to those familiar with the oil treating art. It is accordingly to be understood that the invention is not to be restricted to the specific embodiments herein set forth, but is only to be restricted in accordance with the scope of the following claims.

What is claimed is:

1. The process of separating gaseous olefins and a liquid fraction in the motor fuel boiling range from a mixture containing the same together with heavier hydrocarbons and for obtaining a liquid fraction suited for use as a motor fuel or as a motor fuel blending agent, which comprises treating the mixture in a first fractionating zone under conditions to separate the motor fuel fraction and olefins as an overhead vapor fraction and to remove the heavier constituents therefrom as a liquid fraction, removing said overhead fraction, raising the pressure of said overhead fraction to a high pressure suited for introduction into a fractionating zone operated at temperatures and pressures to separate methane and lighter constituents as an overhead vapor, cooling said fraction to remove the heat of compression, removing the liquid condensate thus formed, dehydrating the gases and further cooling to a temperature suited for introduction into said last fractionating zone, introducing said gases into said last zone, removing the methane and lighter hydrocarbon gases as an overhead vapor, introducing the liquid fraction from said last zone, together with said condensate, into a series of fractionating zones with progressively increasing temperatures and progressively decreasing pressures under conditions for the separation and removal of the various olefins as successive overhead fractions, while introducing the liquid fraction from each zone into the succeeding fractionating zone, removing the liquid fraction from the last fractionating zone, passing the same through a polymerizing zone in contact with a material capable of assisting the polymerization of the unstable compounds, treating the resulting fluid in a rerun zone under conditions to remove the polymers and leave a liquid motor fuel fraction and recycling the polymers to said first fractionating zone for further treatment therein.

2. The process for separating gaseous olefins and a liquid fraction in the motor fuel boiling range from gaseous mixtures containing the same and heavier hydrocarbons, which comprises treating the mixture in a fractionating zone at temperatures and pressures to separate the motor fuel fraction and olefins as an overhead vapor fraction and to remove the heavier constituents therefrom as a liquid fraction, removing said overhead fraction and cooling the same to effect a primary separation of the motor fuel fraction as a liquid from the gaseous olefins, compressing the gases to a high pressure suited for introduction into a fractionating zone operated at temperatures and pressures to separate methane and lighter constituents as an overhead vapor, combining said separated liquid motor fuel fraction with said compressed gases, cooling the compressed gases and combined liquid to remove the heat of compression, removing the liquid condensate, dehydrating the gases, further cooling the same to a temperature suited for introduction into said last fractionating zone, introducing said gases into said last zone, removing the methane and lighter hydrocarbon gases as an overhead vapor, introducing the liquid fraction from said last zone together with said condensate into a second zone operated under conditions suited to the separation of ethylene as an overhead fraction, removing the ethylene from the system as a final product, introducing the liquid fraction from the last zone into a third fractionating zone operated under conditions to separate the propylene as an overhead fraction, removing the propylene from the system as a second product, introducing the liquid fraction from the last zone into a fourth fractionating zone operated under conditions to separate the butylene as an overhead fraction, removing the butylene from the system as a third product, passing a liquid fraction from said last zone through a polymerizing zone in contact with a material capable of assisting in the polymerization of the unstable compounds, treating the resulting fluid in a rerun zone under conditions to remove the polymers and leave a liquid fraction suited to be used as a motor fuel or as a motor fuel blending agent, and recycling the polymers to said first fractionating zone for further treatment therein.

CLINTON C. STEWARD.
CHARLES T. DRANEY.